United States Patent
Nishida et al.

(10) Patent No.: US 10,297,837 B2
(45) Date of Patent: May 21, 2019

(54) METHOD OF MANUFACTURING ELECTRODE CATALYST LAYER FOR FUEL CELL, AND ELECTRODE CATALYST LAYER FOR FUEL CELL

(71) Applicant: TOYOTA JIDOSHA KABUSHIKI KAISHA, Toyota-shi, Aichi-ken (JP)

(72) Inventors: Tsunemasa Nishida, Nagoya (JP); Hiroo Yoshikawa, Toyota (JP); Noriyuki Suzuki, Toyota (JP); Masato Hamano, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 669 days.

(21) Appl. No.: 14/868,631

(22) Filed: Sep. 29, 2015

(65) Prior Publication Data

US 2016/0104896 A1    Apr. 14, 2016

(30) Foreign Application Priority Data

Oct. 14, 2014    (JP) ................................ 2014-209658

(51) Int. Cl.
| | | |
|---|---|---|
| *H01M 4/88* | (2006.01) | |
| *H01M 4/90* | (2006.01) | |
| *H01M 8/1018* | (2016.01) | |

(52) U.S. Cl.
CPC ......... *H01M 4/8828* (2013.01); *H01M 4/881* (2013.01); *H01M 4/8882* (2013.01); *H01M 4/9083* (2013.01); *H01M 2008/1095* (2013.01)

(58) Field of Classification Search
CPC ............ H01M 4/8825; H01M 4/8828; H01M 4/9083; H01M 4/881; H01M 4/8882; H01M 2008/1095
See application file for complete search history.

(56) References Cited

U.S. PATENT DOCUMENTS

| | | |
|---|---|---|
| 2008/0269360 A1 | 10/2008 | Itoh et al. |
| 2008/0292943 A1 | 11/2008 | Fongalland et al. |
| | (Continued) | |

FOREIGN PATENT DOCUMENTS

| | | |
|---|---|---|
| CN | 101223253 A | 7/2008 |
| CN | 103348520 A | 10/2013 |
| | (Continued) | |

OTHER PUBLICATIONS

Curnick, Oliver J., Bruno G. Pollet, and Paula M. Mendes. "Nafion®-stabilised Pt/C electrocatalysts with efficient catalyst layer ionomer distribution for proton exchange membrane fuel cells." Rsc Advances 2.22 (2012): 8368-8374. (Year: 2012).*

*Primary Examiner* — Philip A. Stuckey
(74) *Attorney, Agent, or Firm* — Dickinson Wright, PLLC

(57) ABSTRACT

There is provided a method of manufacturing an electrode catalyst layer for fuel cell. This manufacturing method comprises: (a) separating an ionomer solution by centrifugation into a supernatant that includes only an ionomer as a low molecular-weight component in the ionomer solution and a sediment including an ionomer as a high molecular-weight component having a higher molecular weight than that of the low molecular-weight component included in the supernatant; (b) using the ionomer included in the sediment as an ionomer for electrode catalyst layer and producing a catalyst ink that includes catalyst-supported particles with a catalyst metal supported thereon, a solvent and the ionomer for electrode catalyst layer; and (c) using the catalyst ink to form an electrode catalyst layer.

3 Claims, 5 Drawing Sheets

(56) References Cited

U.S. PATENT DOCUMENTS

| | | |
|---|---|---|
| 2009/0280976 A1 | 11/2009 | Lee |
| 2013/0252134 A1 | 9/2013 | Takami et al. |
| 2013/0330657 A1 | 12/2013 | Shoemaker et al. |
| 2014/0228200 A1 | 8/2014 | Toyoshima et al. |
| 2016/0056476 A1 | 2/2016 | Ishihara et al. |

FOREIGN PATENT DOCUMENTS

| | | |
|---|---|---|
| JP | 2006-173098 | 6/2006 |
| JP | 2008-540793 A | 11/2008 |
| JP | 2011-29020 A | 2/2011 |
| JP | 2011-159517 | 8/2011 |
| JP | 2014-192070 A | 10/2014 |
| KR | 10-2006-0131934 A | 12/2006 |
| KR | 10-2009-0116000 A | 11/2009 |
| WO | 2007115898 A1 | 10/2007 |

\* cited by examiner

METHOD OF MANUFACTURING ELECTRODE CATALYST LAYER FOR FUEL CELL, AND ELECTRODE CATALYST LAYER FOR FUEL CELL

CROSS-REFERENCE TO RELATED APPLICATIONS

The present application claims priority from Japanese patent application No. 2014-209658 filed on Oct. 14, 2014, the entirety of disclosure of which is hereby incorporated by reference into this application.

BACKGROUND

Field

The present invention relates to a method of manufacturing an electrode catalyst layer for fuel cell, and an electrode catalyst layer for fuel cell.

Related Art

A membrane electrode assembly (MEA) used for a fuel cell is a power generation element including an electrolyte membrane and electrodes (anode and cathode) formed on respective surfaces of the electrolyte membrane. Each of the electrodes includes an electrode catalyst layer that is placed to be in contact with the electrolyte membrane and a gas diffusion layer formed on the electrode catalyst layer. For example, as described in JP 2011-159517A, the electrode catalyst layer may be formed by coating a base material with a catalyst ink, which is produced by mixing and dispersing a catalyst metal-supported carrier and an ionomer (electrolyte resin) as a proton conductor in a solvent, and drying the catalyst coated base material. JP 2006-173098A describes using a radical polymerization initiator in manufacture of an electrolyte material for fuel cell (corresponding to the ionomer) that is made of a sulfonic acid group-containing polymer to produce the electrolyte material for fuel cell which suppresses generation of an unstable end group, and using this material for the electrode catalyst layer.

A fluororesin (for example, Nafion (registered trademark)) that is a high-molecular polymer having a sulfonic acid group ($-SO_3H$) as an end group is often used as an electrolyte material or more specifically ionomer. The high-molecular polymer is likely to be deteriorated (decomposed) from its end group. In the electrode catalyst layer including such a high-molecular polymer as the ionomer, sulfate ion ($SO_4^{2-}$) is increased by decomposition of the sulfonic acid group as the end group with heat applied especially in the drying process. This decreases pH in the fuel cell or more specifically in the membrane electrode assembly of the fuel cell to provide an acidic environment. The acidic environment of the membrane electrode assembly causes excessive elution of a radical scavenger (for example, cerium oxide) included in the gas diffusion layer of the membrane electrode assembly and leads to poisoning of the electrode catalyst layer. Poisoning of the electrode catalyst layer causes reduction of the proton conductivity of the electrode catalyst layer and thereby leads to increase in impedance of the electrode comprised of the electrode catalyst layer and the gas diffusion layer and reduction of the power generation performance of the fuel cell.

Additionally, the inventors of the present application have found the following problems. The high ratio of a low molecular-weight component of the ionomer in the electrode catalyst layer causes a significant increase of sulfate ion by decomposition of the ionomer. This leads to significant reduction of the proton conductivity of the electrode catalyst layer due to poisoning of the electrode catalyst layer, significant increase in impedance of the electrode, and significant reduction of the power generation performance of the fuel cell.

Neither JP 2011-159517A nor JP 2006-173098A describes the above problems caused by generation of the sulfate ion. Additionally, neither JP 2011-159517A nor JP 2006-173098A describes the problems that the high ratio of a low molecular-weight component of the ionomer in the electrode catalyst layer causes a significant increase of sulfate ion by decomposition of the ionomer and leads to significant reduction of the proton conductivity of the electrode catalyst layer due to poisoning of the electrode catalyst layer, significant increase in impedance of the electrode, and significant reduction of the power generation performance of the fuel cell.

SUMMARY

In order to solve at least part of the above problems, the invention may be implemented by any of the following aspects.

(1) According to one aspect of the invention, there is provided a method of manufacturing an electrode catalyst layer for fuel cell. This manufacturing method comprises: (a) separating an ionomer solution by centrifugation into a supernatant that includes only an ionomer as a low molecular-weight component in the ionomer solution and a sediment including an ionomer as a high molecular-weight component having a higher molecular weight than that of the low molecular-weight component included in the supernatant; (b) using the ionomer included in the sediment as an ionomer for electrode catalyst layer and producing a catalyst ink that includes catalyst-supported particles with a catalyst metal supported thereon, a solvent and the ionomer for electrode catalyst layer; and (c) using the catalyst ink to form an electrode catalyst layer.

The method of manufacturing the electrode catalyst layer for fuel cell according to this aspect suppresses an increase of sulfate ion by decomposition of an ionomer having a sulfonic acid group as an end group. As a result, this produces the electrode catalyst layer that suppresses at least part of reduction of the proton conductivity of the electrode catalyst layer due to poisoning of the electrode catalyst layer, increase in impedance of an electrode of a resulting membrane electrode assembly and reduction of power generation performance of a resulting fuel cell.

(2) In the method of manufacturing the electrode catalyst layer for fuel cell according to the above aspect, a centrifugal force may be set in a range of 600,000 to 750,000 G, a centrifugation time may be set in a range of 50 to 100 minutes, and an environment temperature may be set in a range of 15 to 35° C., as conditions of the centrifugation.

The method of manufacturing the electrode catalyst layer for fuel cell according to this aspect facilitates separation of the low molecular-weight component which causes a significant increase of sulfate ion by decomposition of the ionomer.

(3) According to another aspect of the invention, there is provided an electrode catalyst layer for fuel cell, comprising an ionomer for electrode catalyst layer and catalyst-supported particles with a catalyst metal supported thereon. In this electrode catalyst layer for fuel cell, a ratio of a low molecular-weight component included in the ionomer for electrode catalyst layer is equal to or lower than a predetermined value.

In the electrode catalyst layer for fuel cell according to this aspect, the ratio of the low molecular-weight component that causes a significant increase of sulfate ion by decomposition of the ionomer is reduced to be equal to or lower than the predetermined value in the ionomer for electrode catalyst layer. This suppresses an increase of sulfate ion by decomposition of an ionomer having a sulfonic acid group as an end group. As a result, the electrode catalyst layer suppresses at least part of reduction of the proton conductivity of the electrode catalyst layer due to poisoning of the electrode catalyst layer, increase in impedance of an electrode of a resulting membrane electrode assembly and reduction of power generation performance of a resulting fuel cell.

The invention may be implemented by various aspects related to various manufacturing methods and products, other than the method of manufacturing the electrode catalyst layer for fuel cell described above: for example, a method of manufacturing a catalyst ink for formation of an electrode catalyst layer, a method of manufacturing a membrane electrode assembly, an electrode catalyst layer for fuel cell, a membrane electrode assembly and a fuel cell.

DESCRIPTION OF THE EMBODIMENTS

Figure 1:
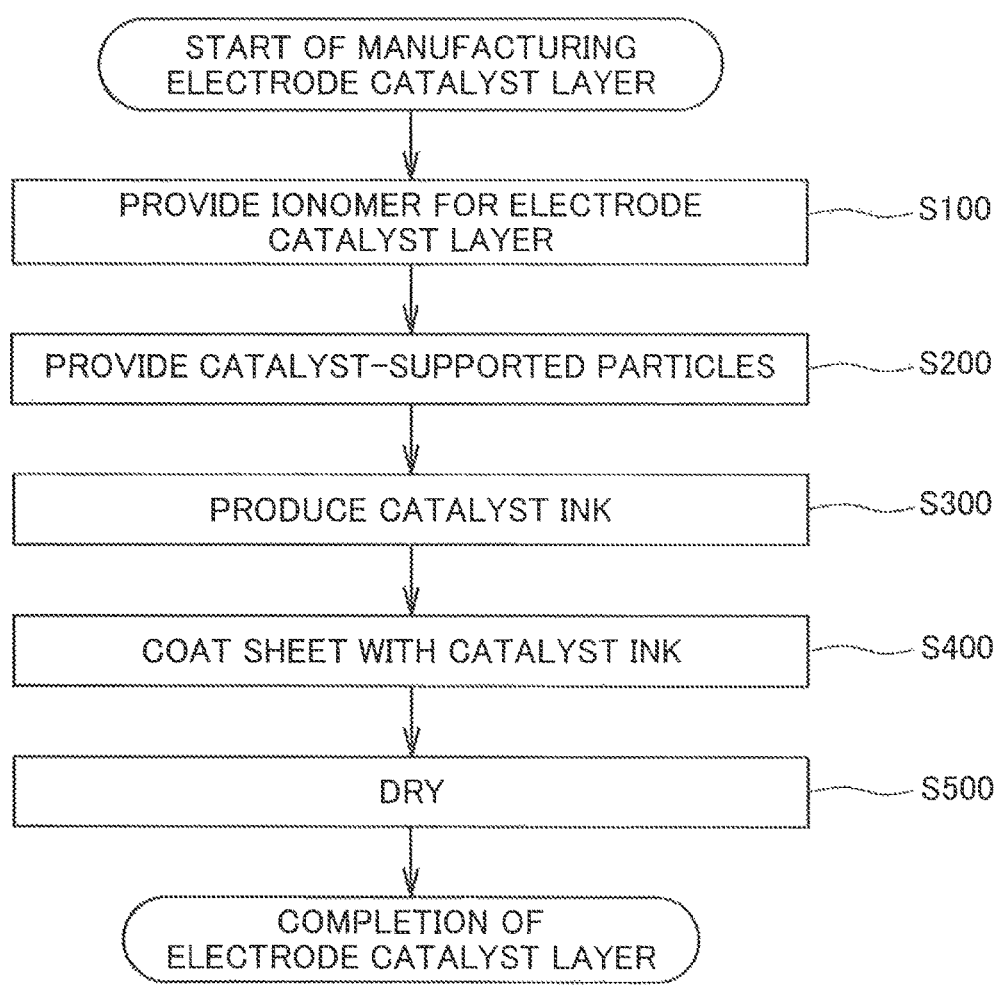
FIG. 1 is a flowchart showing a method of manufacturing an electrode catalyst layer for fuel cell according to one embodiment.

FIG. 1 is a flowchart showing a method of manufacturing an electrode catalyst layer for fuel cell according to one embodiment. This manufacturing method provides an ionomer for electrode catalyst layer (step S100), provides catalyst-supported particles (step S200), produces a catalyst ink (step S300), coats a sheet with the catalyst ink (step S400) and dries the catalyst coated sheet (step S500), so as to produce an electrode catalyst layer for fuel cell. This method is described in detail below.

Figure 2:
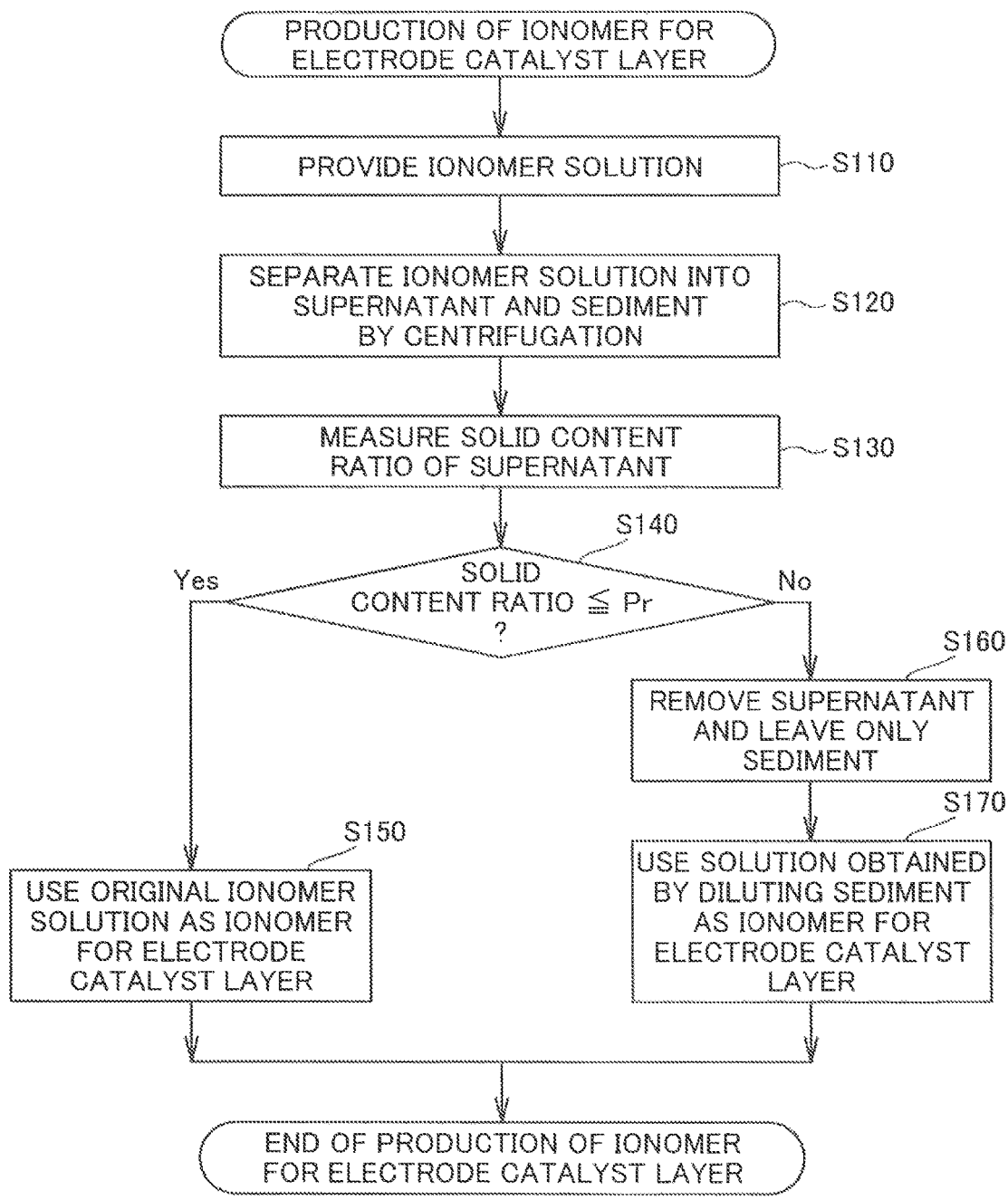
FIG. 2 is a flowchart showing a production process of an ionomer for electrode catalyst layer.

FIG. 2 is a flowchart showing a production process of the ionomer for electrode catalyst layer. The production process first provides an ionomer solution (step S110) and separates the ionomer solution into a supernatant and a sediment by centrifugation (step S120). The ionomer included in the supernatant is called "low molecular-weight component", and the ionomer included in the sediment is called "high molecular-weight component". The ionomer used is a proton-conductive electrolyte material having a sulfonic acid group as an end group, such as Nafion (registered trademark). The solvent used for the ionomer solution may be water or a volatile solvent. The following description is on the assumption that Nafion is used as the ionomer and water is used as the solvent.

The production process subsequently measures the weight ratio of the solid content in the supernatant (solid content ratio) (step S130) and determines whether the solid content ratio is equal to or lower than a specified value Pr [wt %] (step S140). The solid content ratio is a value obtained by dividing the weight of the solid content in the supernatant by the total weight of the supernatant.

Figure 3:
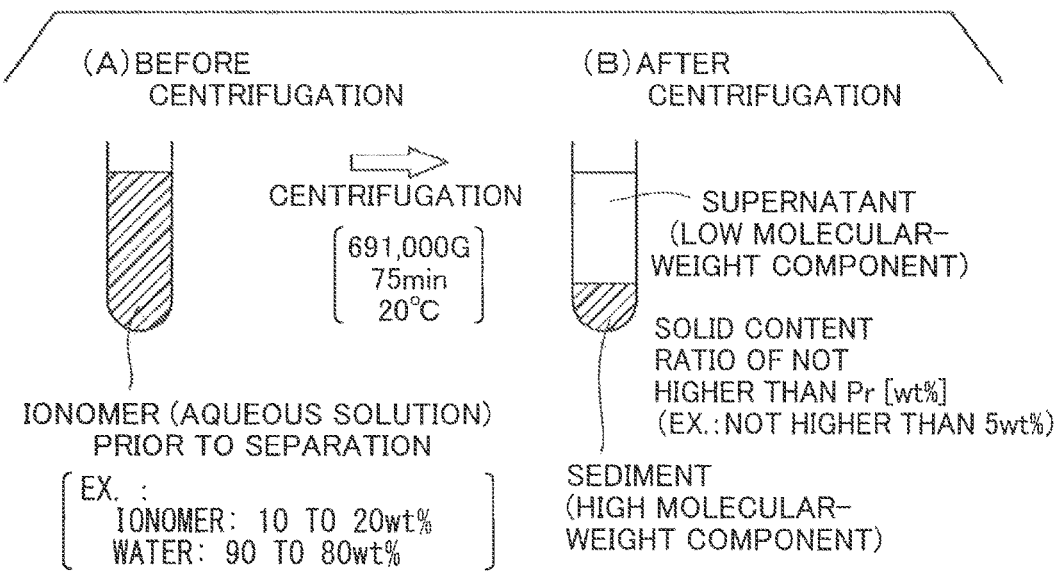
FIG. 3 is diagrams illustrating the state of an ionomer solution before and after centrifugation.

FIG. 3 is diagrams illustrating the state of the ionomer solution before and after centrifugation. As shown in FIG. 3(A), the ionomer solution is placed in a container for centrifugation and is subjected to centrifugal separation by a centrifugal separator. The following description is on the assumption that the ionomer solution used is an aqueous ionomer solution including 10 wt % to 20 wt % of the ionomer and 90 wt % to 80 wt % of water. The centrifugal separator used is not specifically limited but may be any centrifugal machine configured to set at least the centrifugal force [G], the centrifugation time and the temperature as centrifugation conditions that allow for separation of the low molecular-weight component included in the original ionomer. The centrifugal force is preferably in the range of 600,000 to 750,000 G, the centrifugation time is preferably in the range of 50 to 100 minutes, and the environment temperature is preferably in the range of 15 to 35° C. For example, the centrifugation conditions employed may be the centrifugal force of 691,000 G, the centrifugation time of 75 minutes and the temperature of 20° C.

As shown in FIG. 3(B), centrifugation separates the ionomer solution into a supernatant including only the ionomer as the low molecular-weight component and a sediment including the ionomer as the high molecular-weight component having the higher molecular weight than that of the low molecular-weight component included in the supernatant.

Figure 4:
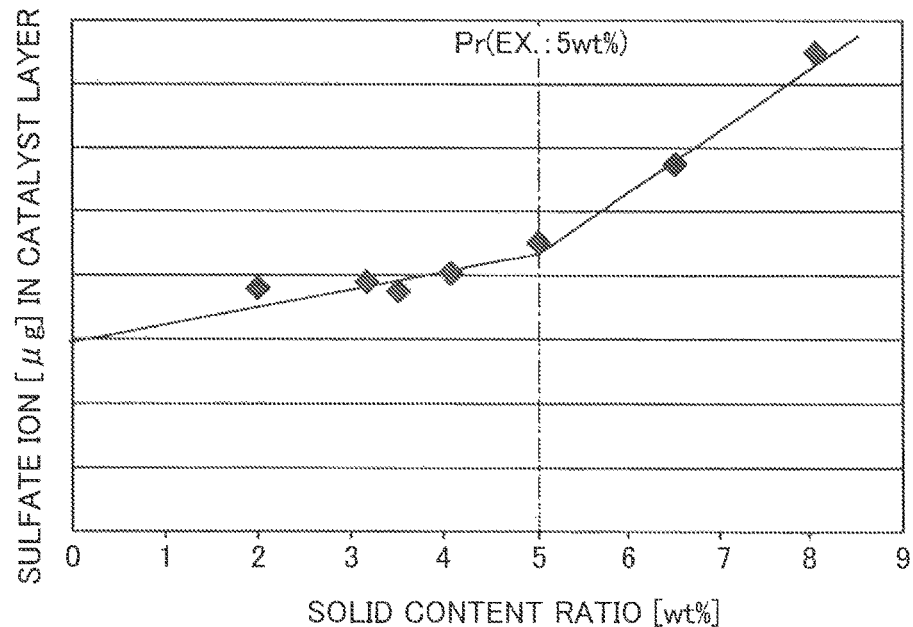
FIG. 4 is a graph showing a relationship between solid content ratio of a supernatant by centrifugation and amount of sulfate ion in an electrode catalyst layer when an original ionomer prior to centrifugation is used as an ionomer for electrode catalyst layer.

FIG. 4 is a graph showing a relationship between the solid content ratio of the supernatant by centrifugation and the amount of sulfate ion in the electrode catalyst layer when the original ionomer prior to centrifugation is used as the ionomer for electrode catalyst layer. The amount of sulfate ion may be measured by analysis of an extract obtained by soaking the electrode catalyst layer in warm water by ion chromatography.

As shown in FIG. 4, the amount of sulfate ion decreases with a decrease in solid content ratio. More specifically, the amount of sulfate ion increases with a higher increase rate at the solid content ratio of higher than a certain solid content ratio Pr (5 wt % in the illustrated example), but increases with a lower increase rate at the solid content ratio of not higher than this solid content ratio Pr. Accordingly, when the solid content ratio of the supernatant obtained by centrifugation of the ionomer solution is equal to or lower than Pr, this indicates suppression of increase of sulfate ion. At step S140, this solid content ratio Pr is used as the criterion to be compared with the solid content ratio of the supernatant obtained by centrifugation.

When the solid content ratio of the supernatant is equal to or lower than the specified value Pr, the ionomer prior to centrifugation is used without any treatment. At step S150 in FIG. 2, the original ionomer solution prior to centrifugation is used as the solution of the ionomer for electrode catalyst layer. When the solid content ratio of the supernatant is higher than the specified value Pr, on the other hand, the production process removes the supernatant and leaves only the sediment at step S160 and uses a solution obtained by diluting the sediment as the solution of the ionomer for electrode catalyst layer at step S170. According to one modification, the processing of steps S160 and S170 may be performed, irrespective of whether the solid content ratio of the supernatant is equal to or lower than Pr.

In the results of experiment shown in FIG. 4, the result at the solid content ratio of 5 wt % corresponds to the result at the ratio of the weight of the low molecular-weight component to the total weight of the ionomer equal to 30 wt %. Accordingly, the ionomer used as the ionomer for electrode catalyst layer may be specified, based on the determination of whether the weight ratio of the low molecular-weight component in the ionomer is equal to or lower than 30 wt %, instead of determination of whether the solid content ratio of the supernatant is equal to or lower than 5 wt %.

The catalyst-supported particles provided at step S200 (FIG. 1) may be produced by, for example, the following process. Conductive particles for supporting that are capable of supporting a catalyst metal are dispersed in a solution of the catalyst metal, and the catalyst-supported particles are produced by impregnation method, coprecipitation method, ion exchange method or the like. The particles for supporting may be selectable from various carbon particles (carbon powders). For example, carbon black or carbon nanotubes may be used as the particles for supporting. The catalyst metal used may be platinum or a platinum compound (for example, platinum-cobalt alloy or platinum-nickel alloy).

The catalyst ink at step S300 may be produced by, for example, the following process. The catalyst-supported particles are mixed with water (ion exchange water) and are subsequently mixed with a plurality of hydrophilic solvents (hereinafter simply called "solvents") such as ethanol and propanol and the ionomer for electrode catalyst layer. The resulting mixture is dispersed using, for example, an ultrasonic homogenizer or a bead mill, so that the catalyst ink is produced. The water and the hydrophilic solvents included in the catalyst ink are collectively referred to as "solvent". The production method of the catalyst ink is not limited to this process, but any of various other methods may be employed to produce a dispersion of the catalyst-supported particles, the solvent and the ionomer for electrode catalyst layer.

Figure 5:
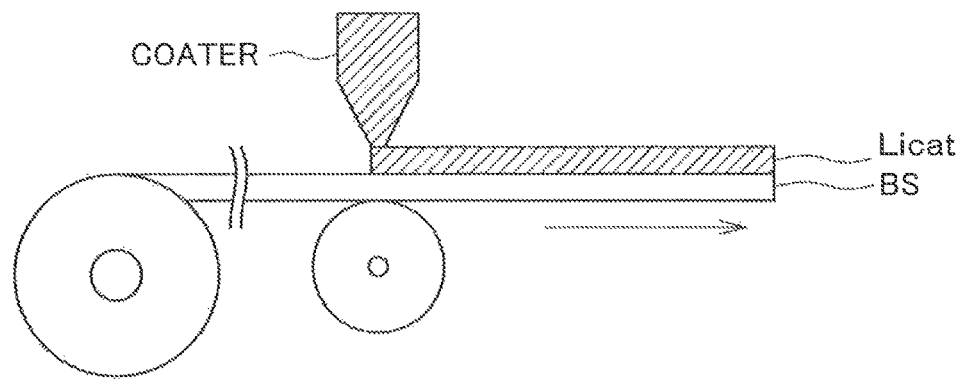
FIG. 5 is a diagram illustrating coating a sheet with catalyst ink.

FIG. 5 is a diagram illustrating coating a sheet with the catalyst ink. As shown in FIG. 5, at step S400 (FIG. 1), a long sheet BS wound off from a roll is coated with the catalyst ink by using a coater (for example, die coater), so that a coated layer of catalyst ink Licat is formed on the sheet BS.

The drying process (heating process) at step S500 (FIG. 1) dries the coated layer of catalyst ink Licat formed on the sheet BS, so as to form the electrode catalyst layer on the sheet BS.

Figure 6:
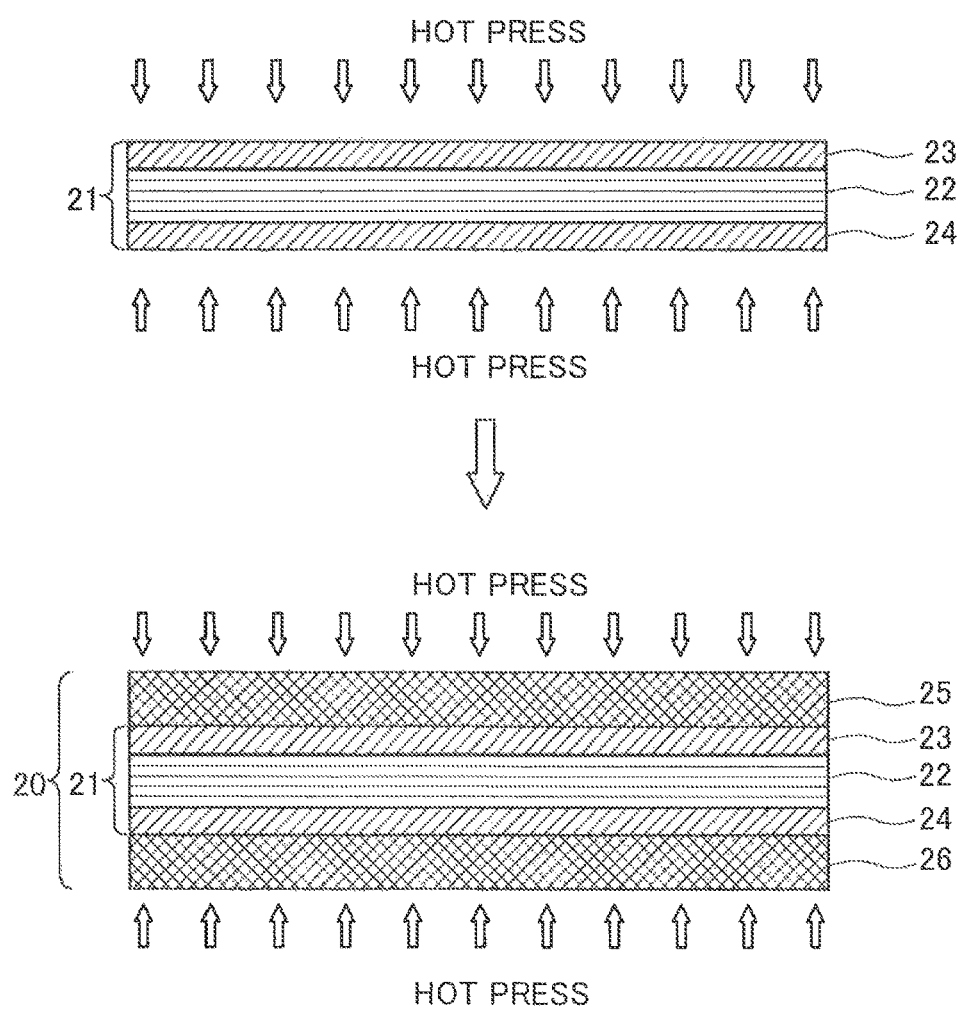
FIG. 6 is a diagram illustrating a membrane electrode assembly configured by using electrode catalyst layers.

FIG. 6 is a diagram illustrating a membrane electrode assembly configured by using the electrode catalyst layers. As shown in FIG. 6, electrode catalyst layers 23 and 24 produced by the above manufacturing method are placed on the respective surfaces of an electrolyte membrane 22 and are hot pressed. This provides a catalyst coated membrane (CCM) 21 that has the electrode catalyst layer 23 formed on (joined with) one surface of the electrolyte membrane 22 and the electrode catalyst layer 24 formed on the other surface of the electrolyte membrane 22. The electrolyte membrane 22 is a proton-conductive ion exchange resin membrane that is made of an ionomer having a sulfonic acid group as an end group, like the ionomer for electrode catalyst layer. This embodiment uses a Nafion membrane made of Nafion (registered trademark) as the electrolyte membrane 22.

Gas diffusion layers (GDL) 25 and 26 are then placed on the respective surfaces of the catalyst coated membrane 21 and are hot pressed. This provides a membrane electrode assembly (MEA) 20 that has the gas diffusion layer 25 formed on (joined with) a surface of the electrode catalyst layer 23 of the catalyst coated membrane 21 and the gas diffusion layer 26 formed on a surface of the electrode catalyst layer 24 of the catalyst coated membrane 21. The gas diffusion layers 25 and 26 are made of a gas-permeable conductive material, for example, carbon porous material such as carbon cloth or carbon paper or a metal porous material such as metal mesh or metal foam. The gas diffusion layers 25 and 26 are impregnated with a radical scavenger (for example, cerium oxide). The catalyst coated membrane 21 may be called "membrane electrode assembly", and the membrane electrode assembly 20 may be called "membrane electrode and gas diffusion layer assembly (MEGA).

For the simple explanation, FIG. 6 illustrates producing the catalyst coated membrane from the electrode catalyst layers and the electrolyte membrane in the sheet form. The invention is, however, not limited to this configuration. Long electrode catalyst layers may be hot pressed on a long electrolyte membrane, or a plurality of electrode catalyst layers in the sheet form may be hot pressed on a long electrolyte membrane at predetermined intervals. Additionally, a plurality of gas diffusion layers in the sheet form may be further hot pressed at predetermined intervals. This produces a continuous sheet of a plurality of membrane electrode assemblies, which may be subsequently cut into individual pieces.

Figure 7:
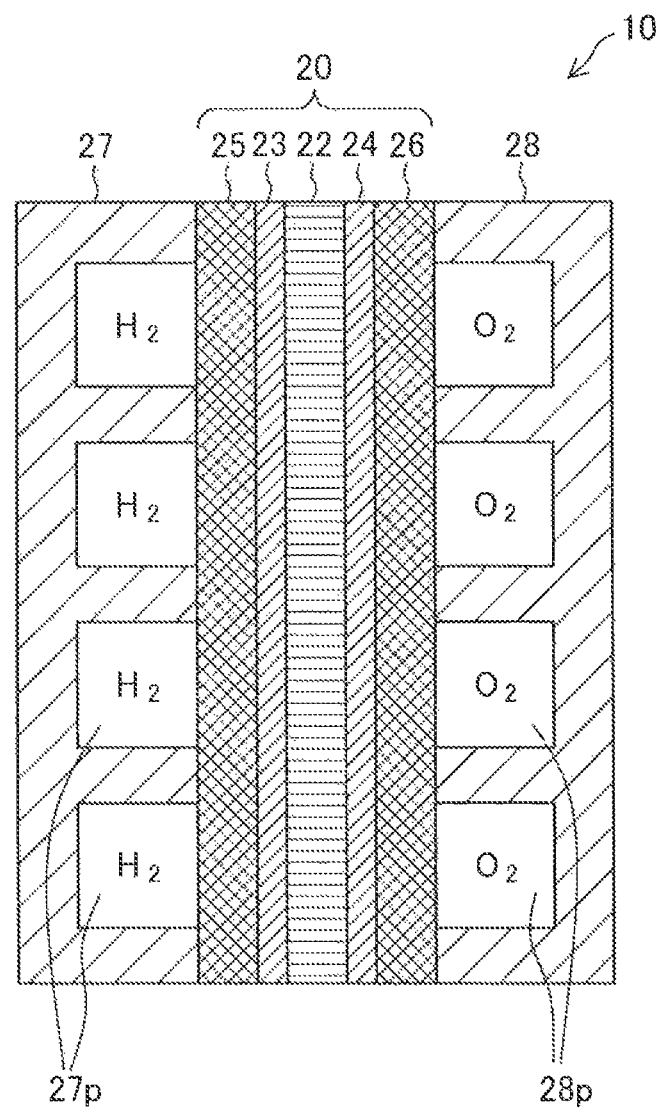
FIG. 7 is a diagram illustrating a fuel cell configured by using the membrane electrode assembly.

FIG. 7 is a diagram illustrating a fuel cell configured by using the membrane electrode assembly. A fuel cell 10 is configured by placing the membrane electrode assembly 20 shown in FIG. 6 between a separator 27 located on the anode (electrode catalyst layer 23 and gas diffusion layer 25) side and a separator 28 located on the cathode (electrode catalyst layer 24 and gas diffusion layer 26) side.

The separators 27 and 28 are made of a gas-impermeable conductive material, for example, dense carbon obtained by compressing carbon to be gas impermeable or press-molded metal plate. Surfaces of the separators 27 and 28 placed to be in contact with the membrane electrode assembly 20 have concavity and convexity to form flow paths for a fuel gas and an oxidizing gas. More specifically, fuel gas flow paths 27p for the flow of fuel gas ($H_2$) subjected to the electrochemical reaction at the anode are formed between the gas diffusion layer 25 and the separator 27 on the anode side. Oxidizing gas flow paths 28p for the flow of oxidizing gas ($O_2$ or more specifically the air including $O_2$) subjected to the electrochemical reaction at the cathode are formed between the gas diffusion layer 26 and the separator 28 on the cathode side.

In the actual use, fuel cells are generally used in the form of a fuel cell stack having the stacked structure of a plurality of the fuel cells 10 shown in FIG. 7.

The method of manufacturing the electrode catalyst layer for fuel cell described above uses the ionomer having the ratio of the low molecular-weight component reduced to or below a predetermined value as the ionomer for electrode catalyst layer to produce an electrode catalyst layer. In the resulting electrode catalyst layer, this method suppresses an increase of sulfate ion generated by decomposition of the ionomer having the sulfonic acid group as the end group with heat applied in the drying process. In a fuel cell configured by using a membrane electrode assembly including these electrode catalyst layers, this method suppresses poisoning of the electrode catalyst layers caused by excessive elution of the radical scavenger (for example, cerium oxide) included in the gas diffusion layers. As a result, this method suppresses reduction of the proton conductivity of the electrode catalyst layers and increase in impedance of the electrode of the membrane electrode assembly, thus suppressing reduction of the power generation performance of the fuel cell.

In production of the ionomer for electrode catalyst layer described above (FIG. 2), an ionomer having a small amount of the low molecular-weight component may be selectively used by measuring in advance a molecular weight distribution of the ionomer prior to centrifugation. In other words, the ratio of the low molecular-weight component included in the ionomer for electrode catalyst layer may be controlled to be equal to or lower than the predetermined value. This also allows for production of a high-quality electrode catalyst layer with little generation of sulfate ion, a high-quality membrane electrode assembly and a high-quality fuel cell.

In the embodiment described above, the electrode catalyst layers 23 and 24 are produced by coating the sheet BS with the catalyst ink and drying the catalyst coated sheet (as shown in step S400 in FIG. 1 and FIG. 5). One modification may produce the electrode catalyst layer without using the sheet BS by directly coating the electrolyte membrane 22 with the catalyst ink and drying the catalyst coated electrolyte membrane 22. This modification forms electrode catalyst layers 23 and 24 by coating the electrolyte membrane 22 with the catalyst ink and drying the catalyst coated electrolyte membrane 22 so as to form the catalyst coated membrane 21, while the embodiment joins the electrode catalyst layers 23 and 24 with the electrolyte membrane 22 by hot pressing so as to form the catalyst coated membrane 21 (shown in FIG. 6).

In the fuel cell 10 shown in FIG. 7, the channel-like gas flow paths 27p and 28p are formed in the separators 27 and 28 which are arranged across the membrane electrode assembly 20. This configuration is, however, not restrictive. Gas flow paths, for example, porous gas flow paths, may be provided separately between the separators and the membrane electrode assembly. Such gas flow paths may be provided separately between either one of the separators and the membrane electrode assembly.

The invention is not limited to any of the embodiments, the examples and the modifications described above but may be implemented by a diversity of other configurations without departing from the scope of the invention. For example, the technical features of any of the embodiments, examples and modifications corresponding to the technical features of each of the aspects described in Summary may be replaced or combined appropriately, in order to solve part or all of the problems described above or in order to achieve part or all of the advantageous effects described above. Any of the technical features may be omitted appropriately unless the technical feature is described as essential herein.

What is claimed is:

1. A method of manufacturing an electrode catalyst layer for fuel cell, comprising:
    separating a sample of an ionomer solution comprising an ionomer that is a proton-conductive electrolyte material having a sulfonic acid group, by centrifugation into a supernatant and a sediment;
    determining whether or not a solid content ratio of the supernatant is equal to or lower than a predetermined value;
    wherein the solid content ratio is a value obtained by dividing a weight of the solid content in the supernatant by a total weight of the supernatant;
    when the solid content ratio of the supernatant is equal to or lower than the predetermined value, using the ionomer included in the ionomer solution prior to performing the centrifugation as an ionomer for the electrode catalyst layer, and
    when the solid content ratio of the supernatant is higher than the predetermined value, using a component of the ionomer included in the sediment obtained by the centrifugation as the ionomer for the electrode catalyst layer;
    producing a catalyst ink that includes catalyst-supported particles with a catalyst metal supported thereon, a solvent, and the ionomer for the electrode catalyst layer; and
    using the catalyst ink to manufacture an electrode catalyst layer,
    wherein the predetermined value is a value which, in a relation between the solid content ratio of the supernatant after centrifugation and an amount of sulfate ion included in the electrode catalyst layer formed by using the ionomer included in the ionomer solution prior to centrifugation, an increase in the amount of the sulfate ion included in the electrode catalyst layer becomes larger with respect to an increase in the solid content ratio of the supernatant after centrifugation when the solid content ratio of the supernatant is greater than the predetermined value as compared to when the solid content ratio of the supernatant is equal to or lower than the predetermined value.

2. The method of manufacturing the electrode catalyst layer for fuel cell according to claim 1,
    wherein a centrifugal force is set in a range of 600,000 to 750,000 G, a centrifugation time is set in a range of 50 to 100 minutes, and an environment temperature is set in a range of 15 to 35° C., as conditions of the centrifugation.

3. The method of manufacturing the electrode catalyst layer for fuel cell according to claim 1, wherein
    the predetermined value is 5 wt %.

* * * * *